(12) United States Patent
Huegel et al.

(10) Patent No.: US 8,739,523 B2
(45) Date of Patent: Jun. 3, 2014

(54) ROTARY VIBRATION DAMPER WITH CENTRIFUGAL FORCE PENDULUM

(75) Inventors: Christian Huegel, Rheinau (DE); Christian Dinger, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 852 days.

(21) Appl. No.: 12/995,666

(22) PCT Filed: May 14, 2009

(86) PCT No.: PCT/DE2009/000702
§ 371 (c)(1),
(2), (4) Date: Mar. 1, 2011

(87) PCT Pub. No.: WO2009/146673
PCT Pub. Date: Dec. 10, 2009

(65) Prior Publication Data
US 2011/0179782 A1 Jul. 28, 2011

(30) Foreign Application Priority Data
Jun. 2, 2008 (DE) .......................... 10 2008 026 271

(51) Int. Cl.
*F16F 15/131* (2006.01)
(52) U.S. Cl.
USPC .......................... 60/338; 192/30 V; 74/574.2

(58) Field of Classification Search
USPC .......................... 60/338; 192/30 V; 74/574.2
See application file for complete search history.

(56) References Cited

U.S. PATENT DOCUMENTS 6,280,330 B1 * 8/2001 Eckel et al. ........................ 464/3
6,450,065 B1 * 9/2002 Eckel et al. ................... 74/574.4

FOREIGN PATENT DOCUMENTS

| DE | 102 24 874 A1 | 12/2002 |
| DE | 10224874 A1 * | 12/2002 |
| EP | 1 744 074 A2 | 1/2007 |
| EP | 1 780 434 A2 | 5/2007 |
| EP | 1 865 222 A | 12/2007 |

* cited by examiner

*Primary Examiner* — Thomas E Lazo
(74) *Attorney, Agent, or Firm* — Simpson & Simpson, PLLC

(57) ABSTRACT

A rotary vibration damper with an input part and an output part having a centrifugal force pendulum disposed on a flange part of the input part or output part, with several mass parts distributed over the circumference of the flange part, and disposed on two sides of the flange part, in raceways of the flange part, and limitedly displaceable in the circumferential direction, and in the radial direction by which two mass parts are interconnected respectively on opposite sides of the flange part.

17 Claims, 3 Drawing Sheets

ROTARY VIBRATION DAMPER WITH CENTRIFUGAL FORCE PENDULUM

CROSS-REFERENCE TO RELATED APPLICATIONS

This application is the National Stage of PCT International Application No. PCT/DE2009/000702, filed May 14, 2009, which application published in German and is hereby incorporated by reference in its entirety, which application claims priority from German Patent Application No. DE 10 2008 026 271.4, filed Jun. 2, 2008, which is incorporated by reference in its entirety.

FIELD OF THE INVENTION

The invention relates to a rotary vibration damper with a centrifugal force pendulum in which the centrifugal force pendulum is integrated in a flange part of the rotary vibration damper.

BACKGROUND OF THE INVENTION

Rotary vibration dampers feature a centrifugal force pendulum for improving compensation of rotary vibration, particularly introduced into a drive train of a motor vehicle by an internal combustion engine. Such a centrifugal force pendulum can be integrated in an input part or an output part of the rotary vibration damper, in that mass parts of the centrifugal force pendulum are placed in raceways. To fulfill the resonance condition for compensation of rotary vibration, the raceways feature components in circumferential direction and in radial direction, so that the mass parts disposed on both sides of the raceways are displaceable along the raceways. At the same time, two mass parts respectively opposite the raceways can be interconnected. In the mass parts distributed over the circumference, complementary raceways can be introduced to the raceways of the rotary vibration damper. The rolling bodies are received in both raceways, and displace the mass parts on or opposite the rotary vibration damper.

Depending on the resonance conditions introduced by the drive train, and in different media, for example, in air in a dry-operated rotary vibration damper, such as a dual mass flywheel, or service fluids such as hydraulic fluid when using the rotary vibration damper in a torque converter, appropriate centrifugal force pendulums with different mass part weights must be designed.

Furthermore, through congested installation conditions, for example, in the installation space of hydrodynamic torque converters, and dual mass flywheels, great demands are made on the assembly capability of components of the rotary vibration damper.

The task of proposing a rotary vibration damper with an improved centrifugal force pendulum, in which the mass of the mass parts is adapted flexibly to the requirements, therefore arises. For example, a narrow design of the rotary vibration damper with centrifugal force pendulum is proposed nonetheless with greater mass of the mass parts.

Furthermore, the rotary vibration damper should be particularly easy to install in a congested assembly space.

BRIEF SUMMARY OF THE INVENTION

The present invention is a rotary vibration damper with an input part and an output part having a centrifugal force pendulum disposed on a flange part of the input part or output part, with several mass parts distributed over the circumference of the flange part, and disposed on two sides of the flange part, in raceways of the flange part, and limitedly displaceable in the circumferential direction, and in the radial direction by which two mass parts are interconnected respectively on opposite sides of the flange part. In the region of mass parts the flange part features cutouts in which an auxiliary mass part connected respectively with the opposite mass part is disposed. By introducing the auxiliary mass part into the flange part plane, the centrifugal force pendulum can be provided with an auxiliary mass, which is neutral with respect to axial assembly space of the rotary vibration damper with the centrifugal force pendulum. This means that the centrifugal force pendulum mass can be provided with a greater mass fraction, without increasing the working diameter, and for example, the axial assembly space of the rotary vibration damper. Depending on the thickness of the flange part, the auxiliary mass parts that exceed the mass of both axially complementary mass parts can be received in the cutouts. In return, the mass of the mass parts can be restricted so that, as required, an axially reduced assembly space is obtained for the rotary vibration damper.

In one embodiment, the cutouts in the flange part for receiving the auxiliary mass parts are disposed radially outside the cutouts introduced in the flange part for receiving the spring accumulators that become effective upon rotation of the input relative to the output part. For example, four to eight recesses, or advantageously six recesses, can be distributed over the circumference such as spring windows, and thus, a corresponding number of recesses for receiving or respectively an auxiliary mass part can be provided. Because of the larger radius of the recesses for auxiliary mass parts, they can extend over a larger circular segment. In another embodiment, not regarding the recesses for energy accumulator, aligned recesses with a larger or smaller number can be distributed over the circumference.

The recesses for auxiliary mass parts can be disposed between the raceways provided in the flange part for swivel-capable reception of both mass parts and the auxiliary mass part on the flange part. Swiveling or twisting of the mass parts against the flange part is limitedly stopped by the auxiliary mass parts contacting the flange part. In this regard, the auxiliary mass parts can get in contact with the front-side surfaces of the flange part before movement of mass parts inside the raceways and of the rolling bodies. The flange part is limited by the raceways. Thus, premature wear or defect of the parts can be avoided.

In a further embodiment, several mass units respectively are distributed over the circumference, which are formed of auxiliary mass parts respectively received on both sides of the flange part and one received in a recess on the flange part and are interconnected axially spaced from one another. For example, the parts are joined together by means riveting and corresponding distance holders, e.g., by means of distance rivets. In order to prevent rotation of mass parts around a rivet axis, two or several rivets are spaced from one another.

For example, for assembly reasons, at least one of the mass units including both axially opposite mass parts and the auxiliary mass part, for example, two displaced relative to each other in circumferential direction, can feature axially aligned cutouts. In this manner, punch-through through the flange part can be provided at centrifugal force pendulum height. This can serve for the assembly of further parts in the axial surrounding of arranged components of the rotary vibration damper or adjacent components of the drive train on this or other axially congested components. In this way, it is possible to rivet easily on the radius of the centrifugal force pendulum, in that one rivet through the punch-through or an abutment for riveting can be provided through the punch-through. Therefore, the use of auxiliary mass parts is advantageous because the mass lost through the cutout can be compensated or overcompensated in mass parts. Thus, in its size, the cutouts can be adapted to the tools required for assembly. The cutouts are provided as openings in the mass parts. These can also be edge cutouts, for example, in the auxiliary mass parts.

In one embodiment, the flange part can be provided as the input part of an axially adjacent second damper stage disposed on a first damper stage. The first damper stage can feature separate input and output parts that are limitedly rotatable against each other contrary to the effect of energy accumulators disposed over the circumference of such coil or arc springs. Therefore, an input or output part can be formed of two disk or flange parts that are connected non-rotatably with one another radial outside. A disk part provided as part of the output can form the input part or a part of the part simultaneously. For example, this disk part and the axially adjacent flange part containing the centrifugal force pendulum can form the input part. The output part of this damper stage can be disposed between disk part and flange part. Thus, to simplify the assembly, both disk parts are riveted through the cutouts provided in the mass parts and auxiliary mass parts. For this purpose, the cutouts and openings for receiving the rivets are disposed aligned with one another in the disk parts. Such a two-stage rotary vibration damper contains the centrifugal force pendulum in effect between the energy accumulator of the respective damper stages such that such a rotary vibration damper is designed to incorporate the effect of a damper stage, the effect of which the centrifugal force pendulum and finally the effect of a further damper stage. In a more effective manner torsional and rotary vibrations are absorbed. It is obvious that to tune the damper stages to each other and to the centrifugal force pendulum, regarding the design of the masses of the mass units, the form of the raceways etc., the same can be tuned and tuned to the damper stages, the number of units, stiffness, the application diameter, etc., of the energy accumulators can be specified accordingly. It is advantageous for reasons of an axially short assembly space of the damper if the energy accumulators of both damper stages are disposed radially one above the other. It is advantageous using the rotary vibration damper in a torque converter if the energy accumulators of the damper stage facing the turbine wheel are disposed at radial height of a decreasing axial assembly space requirement for the turbine wheel.

In one embodiment, the present invention includes a hydrodynamic torque converter with an impeller driven by an internal combustion engine and a turbine wheel driven by an impeller, the output side being coupled with a transmission input shaft coupled with a transmission unit. The turbine wheel and the second damper stage containing the centrifugal force pendulum with auxiliary mass parts mounted in recesses are coupled together. Cutouts can be provided in the mass parts of the rotary vibration damper and the auxiliary mass parts through which a further, first damper stage is riveted as described above. In other embodiments, two rotary vibration dampers can be provided. A rotary vibration damper in the torque flow from the internal combustion engine acts towards the transmission with an interposed torque converter upstream of the turbine wheel and a rotary vibration damper downstream of the turbine wheel. Further, the torque converter can be bypassed by a lock-up clutch. At least one of the rotary vibration dampers is effectively switched into the torque flow. Riveting of two or several disk-shaped components is also included in the inventive concept. Only the allocation of the rivet circle must occur with respect to the cutouts as the diameter and the circumference can be assigned by rotation if necessary by limited rotation of the parts to be riveted against the cutouts provided in the mass elements of the centrifugal force pendulum. In a further embodiment, a hydrodynamic torque converter can provide that the two-stage rotary vibration damper described above, with its output part, be connected non-rotatably with the turbine wheel. Connection occurs advantageously if the connection of both disk parts has already occurred through the cutouts of the mass elements. Furthermore, the input part of the damper stage is coupled non-rotatably with the centrifugal force pendulum in an advantageous manner with the output part of the second damper stage for a serial arrangement of both damper stages. For effective connection of the rotary vibration damper with a lock-up clutch, the input part of the second damper stage can be connected non-rotatably with the output part of a lock-up clutch. The output part of the damper stage following in the torque flow is connected non-rotatably with the centrifugal force pendulum with the turbine hub that is interlocked, for example, with the transmission input shaft.

Furthermore, in one embodiment the present invention includes a dual mass flywheel, in which an input part or output part is equipped with a centrifugal force pendulum described above, in which the centrifugal force pendulum is integrated in a flange on the primary side, secondary side, or in combinations thereof.

These and other objects and advantages of the present invention will be readily appreciable from the following description of preferred embodiments of the invention and from the accompanying drawings and claims.

BRIEF DESCRIPTION OF THE DRAWINGS

The invention is illustrated in detail based on the exemplary embodiments depicted in FIGS. 1 and 4. The figures are as follows.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs.

Figure 1:
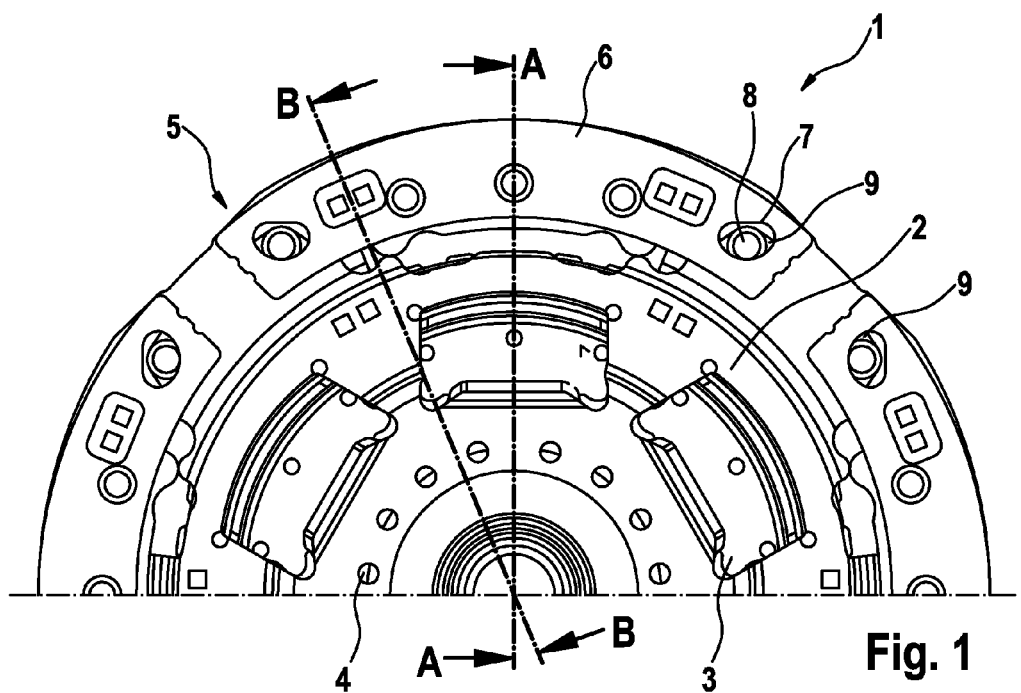
FIG. 1 is a partial side view of a rotary vibration damper with centrifugal force pendulum.

FIG. 1 shows a partial side view of flange part 2 of rotary vibration damper 1. Flange part 2 can form the input part of a simple rotary vibration damper or the input part of a damper stage in complex damper arrangements. Flange part 2 features cutouts 3 distributed over the circumference with forms for centered reception of the energy accumulators (not depicted). Radially within, openings 4 for riveting flange part 2 with an input component are distributed over the circumference, for example, of a turbine shell of a torque converter.

Radially outside cutouts 3, centrifugal force pendulums 5 are disposed, which are formed out of a plurality of mass parts 6 (four mass parts are shown) respectively on both sides of flange part 2 distributed over the circumference. On both ends, observed in circumferential direction, mass parts 6 feature recessed raceways 7 with circumferential components and radial components, so that at a frequency corresponding to that of the rotary vibration, the angularly accelerated flange part displaces the mass parts radially outwards and serves as absorber if the radius is large. The displacement and mounting of mass parts 6 relative to flange part 2 or rather on flange part 2 occurs by means of rolling bodies 8 that are guided in complementary raceways 9 of flange part 2.

Figure 2:
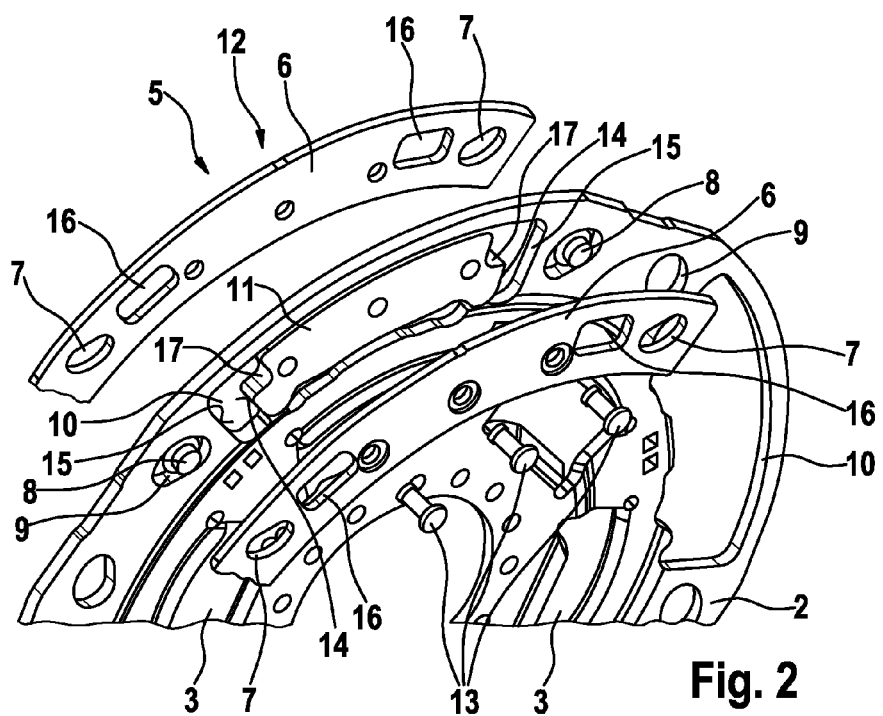
FIG. 2 is an exploded partial perspective view of the centrifugal force pendulum shown in the rotary vibration damper of FIG. 1; and, FIGS. 3 and 4 are partial cross-sectional views of the rotary vibration damper of FIG. 1.

By way of illustration of the design and function of centrifugal force pendulum 5, FIG. 2 shows an exploded partial perspective view of flange part 2 illustrated in FIG. 1. Centrifugal force pendulum 5 includes mass parts 6 distributed over the circumference and received on the two-sides of flange part 2, which are in the form of rolling bodies 8 on flange part 2. For this purpose, raceways 7, 9 are provided on mass parts 6 and on flange part 2 in which the rolling bodies roll. The surfaces of raceways 7, 9 and rolling bodies 8 are partially hardened in order to minimize resonance state changed by wear of the centrifugal force pendulum.

To increase the mass of centrifugal force pendulum 5, recesses 10 are provided in flange part 2 in the area of the arrangement of mass parts 6 radially outside cutouts 3, in which in circumferential direction and in radial direction auxiliary mass part 11 is introduced in a displaceable manner, which is connected with mass part 6 to form mass unit 12. Auxiliary mass parts 11 are designed slightly thicker, so that after connection of mass parts 6 and auxiliary mass part 11, mass parts are already sufficiently spaced from flange part 2. To optimize the mass or an insertion of auxiliary mass part 11 in recess 10, the part can feature appropriate profiles when viewed in circumferential direction, which empathize the course of the auxiliary mass part during displacement of auxiliary mass part 11 along the paths prescribed by raceways 7, 9.

Mass unit 12 is formed through connection of mass parts 6 and auxiliary mass parts 11 through riveting by means of rivets 13 sunken in mass parts 6. To protect raceways 7, 9 they do not form limits for the displacement of mass units 12 against flange part 2. Rather the displacement of mass units is limited by a displacement capability of auxiliary mass parts 11 in recesses 10, in that corresponding limit stops 14, 15 are provided on their front sides.

In mass units 12, in the depicted embodiment between external rivets of rivets 13 and raceways 7, breakthroughs in the form of cutouts 16 are introduced in mass parts 6 and in edge cutouts 17 of auxiliary mass parts 11. Cutouts 16 and edge cutouts 17 are disposed aligned to each other in the axial direction, so that they provided punch-through possibilities for axially adjacent assembly elements. The mass loss of cutouts 16 in mass parts 6 is more than compensated by introducing auxiliary mass parts 11 so that an access to the assembly elements even for increased mass of centrifugal force pendulum 5 is enabled and centrifugal force pendulum 5 in an extended resonance range can be adapted to its damping tasks. It is obvious that rotary vibration damper 1 of the preceding embodiments can be advantageous even without embodiments of cutouts 16, 17 if punch-through is not required and is incorporated in the inventive idea.

Figure 3:
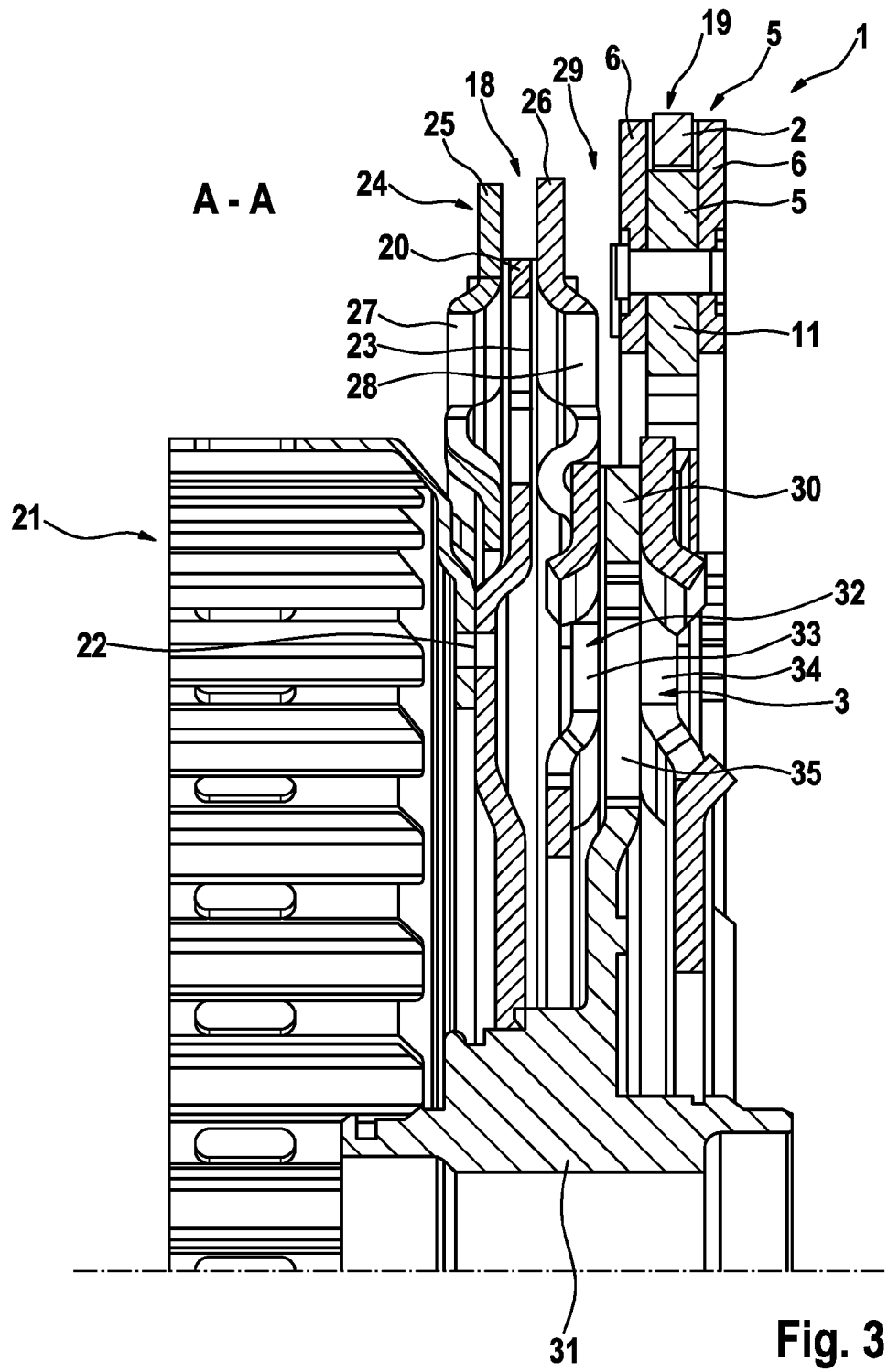
Figure 4:
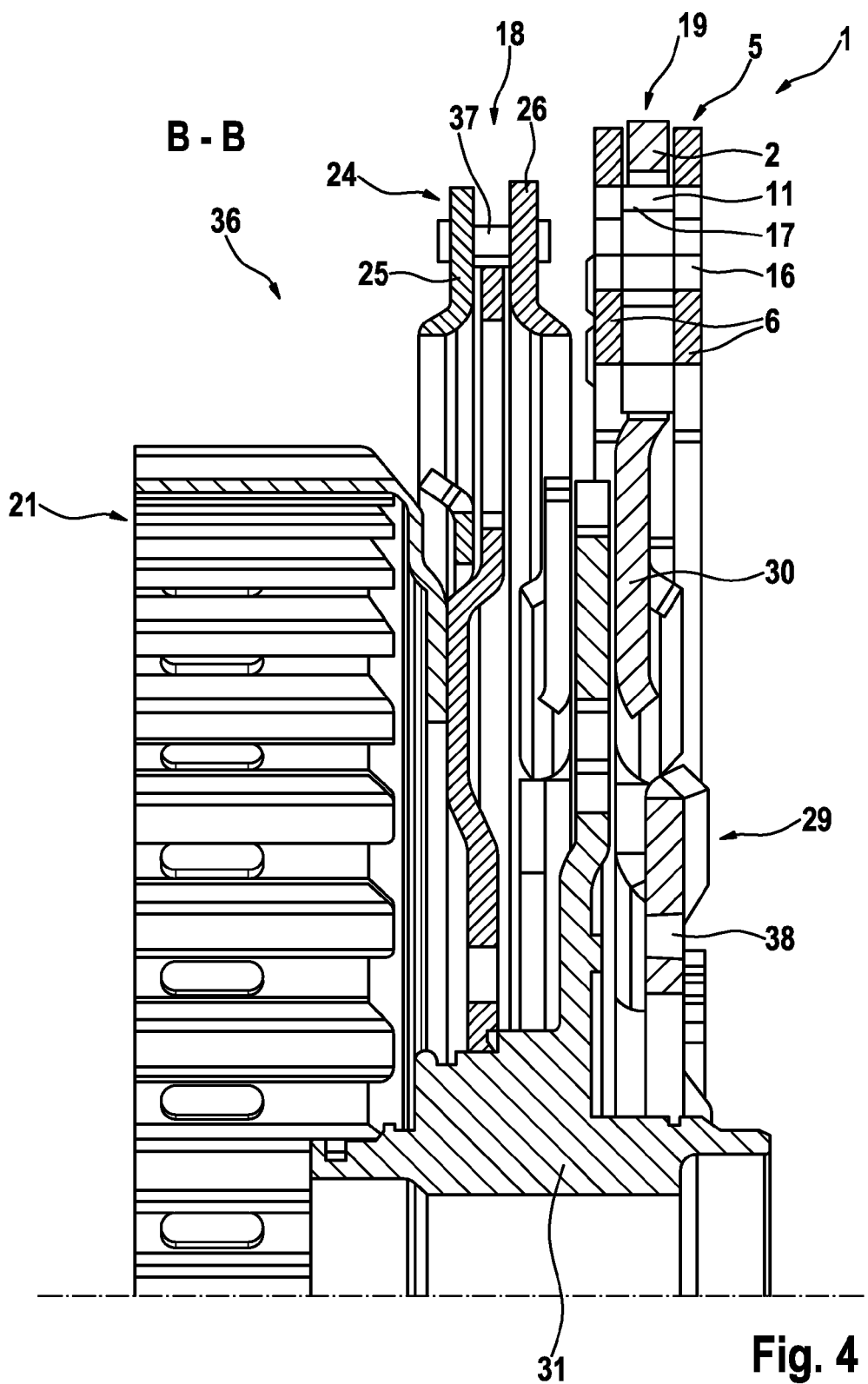

FIGS. 3 and 4 depict rotary vibration damper 1 of FIG. 1 used in a hydrodynamic torque converter along the section lines A-A or B-B, respectively, in the partial cross-sectional view. Rotary vibration damper 1 includes first damper stage 18 and second damper stage 19 featuring centrifugal force pendulum 19. Input part 20 of first damper stage 18 is connected non-rotatably with output part 21, a lock-up clutch (not represented in detail) by means of connection means (not represented), for example, rivets, which are introduced in openings aligned to openings 22. Through pressurizing surfaces 23 provided radially outside the outside circumference of output part 21 on input part 20 and on pressurizing surfaces 27, 28 disposed on disk parts 25, 26 forming output part 24 of first damper stage 18, upon rotation of input part 20 and output 24, the energy accumulators (not represented), for example, arc springs or coil springs are pressurized in the circumferential direction. Disk part 26 in connection with flange part 2 in which centrifugal force pendulum 5 with mass parts 6 and auxiliary mass part 11 is integrated forms input part 29 of second damper stage 19. Output 30 of second damper stage 19, connected non-rotatably with turbine hub 31, is formed as one piece. The turbine hub is connected non-rotatably with a transmission input shaft (not represented) of a transmission, for example, an automatic gear changer with gearing. Between input part 29 and output 30, a second set of energy accumulators (not shown) for damping second damper stage 19 is provided. The energy accumulators assigned to this set are mounted in cutouts 3, 32 of flange part 2 or of disk part 26 and become compressed in circumferential direction by rotation of input part 29 and output part 30 against each other by means of input-side pressurizing 33, 34 and output-side pressurizing surfaces 35.

As illustrated in section B-B of FIG. 4, the turbine wheel is connected non-rotatably by means of openings 38 with input part 29 of second damper stage 19. The arrangement of disk part 25, 26 assigned to rotary vibration damper 1, as well as flange part 2, and if necessary, output part 21 of the lock-up clutch are disposed advantageously as assembly 36 around output part 30 connected with turbine hub 31. Thus, first damper stage 18 from one side and second damper stage 19 from the other side of output part 30 are threaded on turbine hub 31 and centered on it, if necessary. The connection of the first and second damper stage occurs by means of rivets 37 in that both disk parts 25, 26 are riveted together. In order to create a punch-through possibility for riveting disk parts 25, 26, mass parts 6 and auxiliary mass part 11 are provided with cutouts 16 or edge cutout 17. In this manner, centrifugal force pendulum 5 can be disposed on an outside circumference, which essentially corresponds to the outside circumference of first damper stage 18. Furthermore, mass elements 6 distributed over the circumference can feature a maximum possible circumference by taking consideration of its displacement paths in circumferential direction to prevent contact with the circumferential, adjacent mass elements.

The function of rotary vibration damper 1 as shown in FIGS. 3 and 4 is as follows. If the lock-up clutch is opened, the torque to be transmitted on the transmission input shaft over turbine hub 31 is introduced via the turbine wheel onto input part 29 of second damper stage 19 and transmitted under the effect of centrifugal force pendulum 5 and damped by the energy accumulator of second damper stage 19, via output 30 over turbine hub 31 onto the transmission input shaft. Damper stage 19 functions therefore as a turbine damper when lock-up clutch is opened.

If the lock-up clutch is closed, the torque will be transmitted over the output part to input part 20 over the energy accumulators onto output part 24 of first damper stage 18 onto second damper stage 19. In this case, disk part 26 functions as a component of output part 24 and input part 29 as a transmitting component. After first damping in first damper stage 18, the torque is subsequently also damped in second damper stage 19 by means of the energy accumulator disposed between input part 29 and output part 30 as well as by means of the effect of the centrifugal force pendulum, so that the omission of the damping transmission over the torque converter, the additional effect of the first damper stage when lock-up clutch is closed is engaged and the damped torque is fed from output part 30 over turbine hub 31 into the transmission input shaft.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE SYMBOLS 1 rotary vibration damper
2 flange part
3 cutout
4 opening
5 centrifugal force pendulum
6 mass part
7 raceway
8 rolling bodies
9 raceway
10 recess
11 auxiliary mass part
12 mass unit
13 rivet
14 limit stop
15 limit stop
16 cutout
17 edge cutout
18 damper stage
19 damper stage
20 input part
21 output part
22 opening
23 pressurizing surface
24 output part
25 disk part
26 disk part
27 pressurizing surface
28 pressurizing surface
29 input part
30 output part
31 turbine hub
32 cutout
33 pressurizing surface
34 pressurizing surface
35 pressurizing surface
36 assembly
37 rivet
38 openings

What is claimed is:

1. A rotary vibration damper, comprising:
an input part;
at least one output part;
a centrifugal force pendulum disposed on a flange part of the input part or the at least one output part; and,
a plurality of mass parts distributed over the circumference of the flange part and disposed on both sides of the flange part, received in a plurality of raceways of the flange part and limitedly displaceable relative to said plurality of raceways in circumferential direction and in radial direction, of which, two of the plurality of mass parts disposed on opposite sides of the flange part, are connected together, respectively, wherein in the area of the plurality of mass parts, the flange part includes a recess in which an auxiliary mass part, connected respectively with the opposite mass parts, is disposed.

2. The rotary vibration damper recited in claim 1, further comprising energy accumulators in the flange part, wherein the recess is disposed radially outside the energy accumulators.

3. The rotary vibration damper recited in claim 1, wherein the recess is disposed between the plurality of raceways in circumferential direction.

4. The rotary vibration damper recited in claim 1, wherein rotation of the plurality of mass parts against the flange part is restricted by a plurality of limit stops of the auxiliary mass part on the flange part.

5. The rotary vibration damper recited in claim 1, wherein oppositely disposed mass parts and the auxiliary mass part are connected together with a plurality of rivets.

6. The rotary vibration damper recited in claim 1, wherein oppositely disposed mass parts and the auxiliary mass part include an axially aligned cutout.

7. The rotary vibration damper recited in claim 6, wherein the cutout is disposed in the plurality of mass parts between the plurality of rivets and in the plurality of mass parts, and the plurality of raceways is disposed complementarily to the plurality of raceways of the flange part for rolling bodies simultaneously rolling in the plurality of raceways of the flange part and the plurality of mass parts.

8. The rotary vibration damper recited in claim 6, wherein an edge cutout is formed on the outside circumference of auxiliary mass part.

9. The rotary vibration damper recited in claim 1, wherein the flange part is the input part of a second damper stage disposed on an axially adjacent first damper stage.

10. The rotary vibration damper recited in claim 9, wherein the input part or the output part of the first damper stage is formed of two disk parts connected non-rotatably with one another.

11. The rotary vibration damper recited in claim 10, wherein the two disk parts of the input part or the output part are connected with one another by means of the plurality of rivets.

12. The rotary vibration damper recited in claim 11, wherein openings for the plurality of rivets and at least one cutout are aligned to one another.

13. The rotary vibration damper recited in claim 1, comprising a dual mass flywheel, comprising:
an input part connected with an internal combustion engine; and,
an output part limited against the effect of an energy accumulator, rotatable relative to said output part, transmission-side connected respectively with a primary, input-side mass and a secondary transmission-side mass.

14. A hydrodynamic torque converter, comprising:
an impeller driven by an internal combustion engine;
a turbine wheel driven by said impeller on the output side and arranged to be coupled with a transmission input shaft; and,
a rotary vibration damper including:
an input part;
at least one output part;
a centrifugal force pendulum disposed on a flange part of the input part or the at least one output part; and,
a plurality of mass parts distributed over the circumference of the flange part and disposed on both sides of the flange part, received in a plurality of raceways of the flange part and limitedly displaceable relative to said plurality of raceways in circumferential direction and in radial direction, of which, two of the plurality of mass parts disposed on opposite sides of the flange part, are connected together, respectively, wherein in the area of the plurality of mass parts, the flange part includes a recess in which an auxiliary mass part, connected respectively with the opposite mass parts, is disposed and wherein the turbine wheel and the rotary vibration damper are coupled with one another.

15. The hydrodynamic torque converter recited in claim 14, wherein the input part of the rotary vibration damper is connected non-rotatably with the turbine wheel.

16. The hydrodynamic torque converter recited in claim 14, wherein the rotary vibration damper includes first and second damper stages, and the flange part of the second damper stage and the output part of the first damper stage are connected non-rotatably with one another.

17. The hydrodynamic torque converter recited in claim 14, further comprising a lock-up clutch, wherein the rotary vibration damper includes a first damper stage, and the input part of the first damper stage is connected non-rotatably with an output part of the lock-up clutch.

* * * * *